(12) United States Patent
Tripathy et al.

(10) Patent No.: US 12,450,079 B2
(45) Date of Patent: Oct. 21, 2025

(54) COMPONENT MONITORING FRAMEWORK

(71) Applicant: Dell Products L.P., Round Rock, TX (US)

(72) Inventors: Antarlina Tripathy, Bangalore (IN); Baishali Roy, Bangalore (IN); Panguluru Vijaya Sekhar, Bangalore (IN); Sambasivarao Gaddam, South Grafton, MA (US); Shivangi Geetanjali, Patna (IN); Sowmya Kumar, Bangalore (IN); Shivangi Maharana, Cuttack (IN); Sashibhusan Panda, Bengaluru (IN); Shishir Kumar Parhi, Bangalore (IN); Harikrishna Reyyi, Patha Agraharam (IN); Seshadri Srinivasan, Shrewsbury, MA (US); Kiran Kumar Pidugu, Nizamabad (IN); Hung Dinh, Austin, TX (US); Sweta Kumari, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 695 days.

(21) Appl. No.: 17/237,457

(22) Filed: Apr. 22, 2021

(65) Prior Publication Data
US 2022/0342685 A1   Oct. 27, 2022

(51) Int. Cl.
*G06F 9/455* (2018.01)
(52) U.S. Cl.
CPC ........... *G06F 9/45558* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 11,586,437 B1* | 2/2023 | Tripp | G06F 9/54 |
| 2003/0133464 A1* | 7/2003 | Marejka | H04L 49/901 |
| | | | 370/428 |
| 2016/0147550 A1* | 5/2016 | McWilliams | G06F 9/45558 |
| | | | 718/1 |
| 2017/0034036 A1* | 2/2017 | Kohan | H04L 41/5012 |
| 2019/0394080 A1* | 12/2019 | Malboubi | H04L 63/0807 |

(Continued)

OTHER PUBLICATIONS

Mohamed et al., The rSLA Framework: Monitoring and Enforcement of Service Level Agreements for Cloud services, 2016, IEEE International Conference on Services Computing, pp. 1-8 (Year: 2016).*

(Continued)

*Primary Examiner* — Bradley A Teets
*Assistant Examiner* — Melissa A Headly
(74) *Attorney, Agent, or Firm* — Ryan, Mason & Lewis, LLP

(57) ABSTRACT

A method comprises collecting data corresponding to a plurality of components in a system, wherein the data comprises information about one or more issues with the plurality of components. The data is analyzed and categorized based at least in part on the analysis. In the method, one or more application programming interfaces (APIs) are selected to monitor respective statuses of the plurality of components, wherein the selection is based at least in part on the categorization of the data, and the data is pushed to the one or more APIs.

20 Claims, 20 Drawing Sheets

(56) References Cited

U.S. PATENT DOCUMENTS

2020/0034215 A1\* 1/2020 Petrillo .................. G06N 20/20
2022/0414187 A1\* 12/2022 Seck ................... G06F 11/3093

OTHER PUBLICATIONS

Technopedia, "Integration Middleware," https://www.techopedia.com/definition/28054/integration-middleware#:~:text=Integration%20middleware%20is%20the%20alternate,application%20execution%2C%20monitoring%20and%20operations, Accessed Apr. 9, 2021, 10 pages.
Cloud Foundry Docs, "Orgs, Spaces, Roles, and Permissions," https://docs.cloudfoundry.org/concepts/roles.html, Mar. 15, 2021, 4 pages.

\* cited by examiner

| iNaaS | Search | | | | | |
|---|---|---|---|---|---|---|
| | | Engage | Self-Service | Dashboard | Profile | |

| ☐ Home | ◇ E2E Business Life Cycle | 📇 Transaction Search | ◯ Transaction Metrics | 🏢 DataOps Dashboard |
|---|---|---|---|---|

Business ID*  Alt Business ID  Status  App Transaction Type

Sender  Receiver  From Date  To Date
                   mm/dd/yyyy 📅   mm/dd/yyyy 📅

Advance Search ⊙

Search   Reset

| ACTIONS | SENDER | RECEIVER | APP TRANSACTIONS | STATUS | TIMESTAMP | BUSINESS ID |
|---|---|---|---|---|---|---|
| ◯☐☐ | CIC | MYSR | CASE-CONSUMER-MYSR | STARTED | 25-11-2020 13:43:53 | 5003A000014KWEEAA0 |
| ◯☐☐ | CIC | MYSR | CASE-CONSUMER-MYSR | COMPLETED | 25-11-2020 13:43:53 | 5003A000014KWEEAA0 |
| ◯☐☐ | CIC | MYSR | CASE-CONSUMER-MYSR | COMPLETED | 25-11-2020 13:43:53 | 5003A000014LI9DAAS |

Live Monitoring Tool
Get Component Insights

INaaS Search

Engage   Self-Service   Dashboard   Profile

← > E2E Visibility > Lmt

DASHBOARD
- ⊕ PCF
- ⊕ BATCH
- ⊕ Control M
- ⊕ RMQ
- ⊕ DB

Search... 🔍

INaaS Support    Non PROD ›

- MEMORY (GB): 407 — 1102
- CPU USAGE (%): 83 — 1103
- DATABASE LOGS(%): 63 — 1104
- THREADS: 1248101 — 1105

ALERTING APPS — 1106

| HOST | USER | STATUS | CONNECTIONS | LAST UPDATE |
|---|---|---|---|---|
| abcdev01.corp.com | AIC | Critical | 4012 | 2020/08/23 |
| abcdev02.corp.com | AIC | Running | 50 | 2020/11/13 |
| abcdev03.corp.com | AIC | Crashed | 32043 | 2020/11/13 |
| abcdev04.corp.com | AIC | Crashed | 941 | 2020/10/14 |
| abcdev05.corp.com | AIC | Critical | 321 | 2020/10/13 |

DATABASE INSTANCE OVERVIEW — 1107

- abcdev01.corp.com
- abcdev02.corp.com
- abcdev03.corp.com
- abcdev04.corp.com
- abcdev05.corp.com

1100

COMPONENT MONITORING FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for monitoring ecosystem components.

BACKGROUND

A data science integration platform (DSIP) ecosystem may include thousands of virtual machines (VMs) hosting hundreds of different applications and associated middleware. Applications may include, for example, data operations platforms and cloud integration services. Middleware may include, for example, service-oriented architecture (SOA) tools, business-to-business (B2B) tools and message-oriented middleware (MOM) products.

There is a need for appropriate systems and techniques for monitoring the ecosystem components.

SUMMARY

Embodiments provide a component monitoring framework in an information processing system.

For example, in one embodiment, a method comprises collecting data corresponding to a plurality of components in a system, wherein the data comprises information about one or more issues with the plurality of components. The data is analyzed and categorized based at least in part on the analysis. In the method, one or more application programming interfaces (APIs) are selected to monitor respective statuses of the plurality of components, wherein the selection is based at least in part on the categorization of the data, and the data is pushed to the one or more APIs.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts an example user interface comprising a transaction view in an illustrative embodiment.

FIG. 11 depicts an example user interface depicting database statuses in connection with database monitoring in an illustrative embodiment.

DETAILED DESCRIPTION

Figure 1:
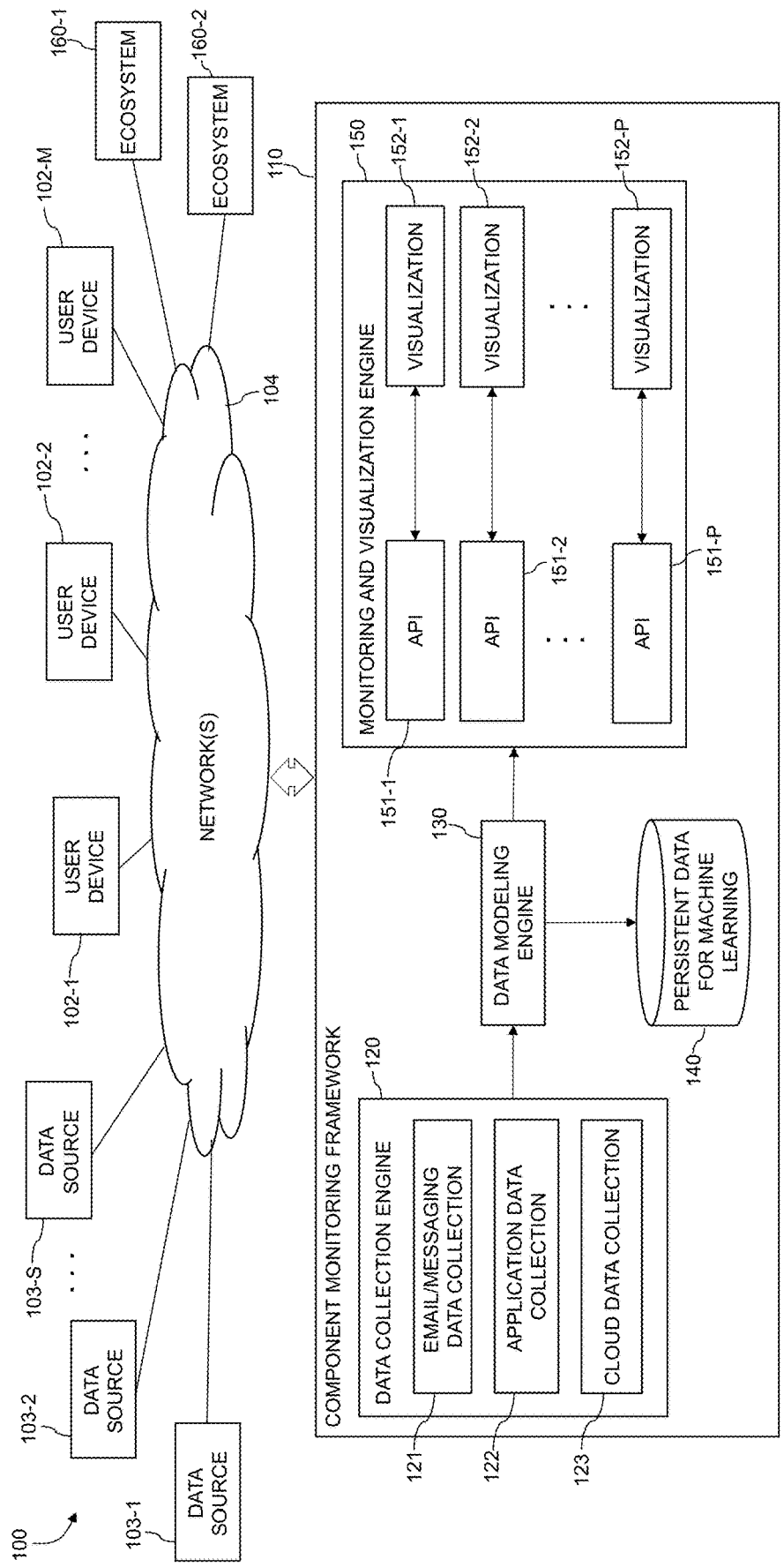
FIG. 1 depicts an information processing system with a component monitoring framework in an illustrative embodiment.

Illustrative embodiments will be described herein with incor to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a component monitoring framework 110.

The user devices 102 can comprise, for example, Internet of Things (IoT) devices, desktop, laptop or tablet computers, mobile telephones, or other types of processing devices capable of communicating with the component monitoring framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, P and S are assumed to be arbitrary positive integers greater than or equal to two.

The terms "client" or "user" herein are intended to be broadly construed so as to encompass numerous arrangements of human, hardware, software or firmware entities, as well as combinations of such entities. Component monitoring services may be provided for users utilizing one or more machine learning models, although it is to be appreciated that other types of infrastructure arrangements could be used. At least a portion of the available services and functionalities provided by the component monitoring framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the component monitoring framework 110, as well as to support communication between the component monitoring framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the component monitoring framework 110.

The information processing system 100 further includes ecosystem 160-1 and ecosystem 160-2 (collectively "ecosystems 160") connected to the user devices 102 and to the component monitoring framework 110 via the network 104. The ecosystems 160 comprise, for example, servers, VMs, middleware and applications, which are connected over one or more networks like network 104 and/or through direct wired connections. The component monitoring framework 110 generates visualizations depicting one or more statuses of the components of one or more of the ecosystems 160 for users such as, for example, ecosystem administrators, so that the users can efficiently view the real-time statuses of components of one or more of the ecosystems 160. Although two ecosystems 160-1 and 160-2 are shown, the embodiments are not necessarily limited thereto, and more or less ecosystems 160 may be part of the information processing system 100.

Figure 2:
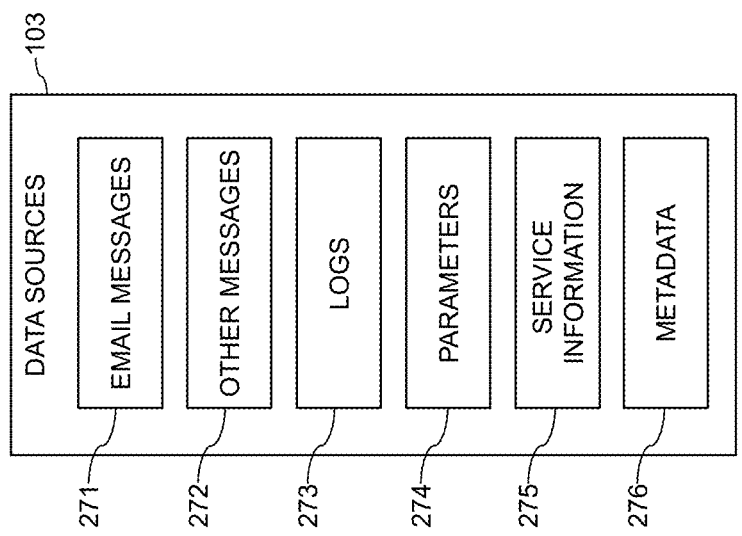
FIG. 2 depicts data sources from which the component monitoring framework collects data in an illustrative embodiment.

The information processing system 100 further includes data sources 103-1, 103-2, . . . 103-S (collectively "data sources 103") which supply data to the component monitoring framework 110 via the network 104. Referring to FIG. 2, the data sources 103 include, but are not necessarily limited to, electronic mail (email) messages 271, other types of messages 272 (e.g., short message service (SMS) messages, device alerts, etc.), logs 273 (e.g., error logs, activity logs or other component operational logs), parameters 274 (e.g., scaling parameters), service information 275 (e.g., cloud service information) and metadata 276 associated with one or more components of the ecosystems 160. In one or more embodiments, the email or other messages 271 and 272 comprise notifications and/or alerts sent to users (e.g., via user devices 102) in response to one or more issues (e.g., failures, anticipated failures) with applications, middleware, servers, VMs or other components of an ecosystem. For example, notifications and/or alerts may be generated from applications, cloud deployment services (e.g., Pivotal Cloud Foundry (PCF)), cloud based website and application performance tracking services (e.g., NewRelic), workflow orchestration services (e.g., Control M) and middleware sources, including, for example, message-oriented-middleware (MOM) providers (e.g., RabbitMQ (RMQ)).

The logs 273 may detail, for example, the one or more issues with the components of an ecosystem. The logs 273 and metadata 276 include, for example, application, middleware, server and database logs and metadata. The parameters 274, such as, for example, scaling or autoscaling parameters, may include HTTP response codes indicating the success or failure of an API request, where failure may be attributed to omission of required parameters and/or errors with servers.

The component monitoring framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The component monitoring framework 110, on behalf of respective infrastructure tenants each corresponding to one or more users associated with respective ones of the user devices 102 provides a platform for data operations tracking associated with multiple components of an ecosystem without having to navigate or search in different dashboards. Advantageously, the component monitoring framework 110 generates interactive graphs showing errors organized by, for example, component, project and/or job type, through which failure trends can be determined with minimal user effort. In one or more embodiments, the component monitoring framework tracks and traces transactions corresponding to different technology layers of an enterprise, and generates multiple views of the transactions. The component monitoring framework 110 further proactively identifies problem areas by automatically analyzing error logs.

Referring to FIG. 1, the component monitoring framework 110 includes a data collection engine 120, a data modeling engine 130, database 140 for persistent data for machine learning and a monitoring and visualization engine 150. The data collection engine 120 includes an email/messaging data collection layer 121, an application data collection layer 122 and a cloud data collection layer 123, which collect data from the data sources 103. The monitoring and visualization engine 150 includes a plurality of monitoring APIs 151-1, 151-2, . . . 151-P (collectively "monitoring APIs 151" or "APIs 151") and a plurality of visualization layers 152-1, 152-2, . . . 152-P (collectively "visualization layers 152").

As noted herein, the data is present in the email messages 271, other types of messages 272, logs 273, parameters 274, service information 275 and metadata 276. The data collection engine 120 provides the collected data to a data modeling engine 130, which analyzes the collected data and categorizes the data based at least in part on the analysis. Based on the categorization of the data, the data modeling engine 130 selects one or more APIs 151 of the monitoring and visualization engine 150 to be used to monitor respective statuses of a plurality of ecosystem components that may have issues identified from the collected data.

In more detail, the data modeling engine 130 parses the data from the data sources 103 to identify and categorize the issues that may be occurring for the components of an ecosystem. For example, categories may include batch or workflow orchestration service component issues, cloud deployment service component issues, cloud based website and application performance tracking service component issues and middleware component issues. In one or more of the categories, sub-categories including the type of component and issue are also identified, such as, for example, server health issues, messaging channel issues (e.g., failed, high latency, high volume, etc.), failed or critical (e.g., on the verge of failing) applications, transactions and/or jobs that have not been completed, exceeding storage capacity and/or access/authentication problems. Based on the categorization and/sub-categorization of the data, the data modeling engine 130 selects one or more APIs 151 that correspond to the type of component and/or type of issue to be used to monitor respective real-time statuses of the components identified from the collected data as having issues. The data modeling engine 130 pushes the corresponding data to the API associated with the data so that the monitoring can be performed and visualizations of the real-time statuses can be generated based on the results of the monitoring. The APIs 151 comprise, for example, representational state transfer (REST) APIs.

The visualization layers 152 receive the monitored component statuses via the APIs 151, and generate visualizations including the statuses, which can be sent to and displayed on the user devices 102. As explained in more detail herein, the visualizations depict, for example, operating statuses of applications, servers, VMs, messaging channels and/or databases. The visualizations may also depict a number of queues and a number of consumers corresponding to MOM products, and amounts and/or types of data flowing into and out of components of an ecosystem. In one or more embodiments, if there are issues with code associated with a given component, one or more of the visualization components retrieves the code associated with the given component, and generates a graphical representation of the code illustrating an interaction of the code with a source system and/or a target system. In addition, one or more of the visualization layers 152 is configured to generate notifications to be sent to the user devices 102 if one or more of the components (e.g., applications, servers, VMS or middleware instances) has failed or has been determined to be at risk of failing. Although the visualization layers 152 are shown as corresponding to the monitoring APIs 151, the embodiments are not necessarily limited thereto. For example, more or less visualization components and visualization components corresponding to more than one of the monitoring APIs 151 can be used.

Figure 13:
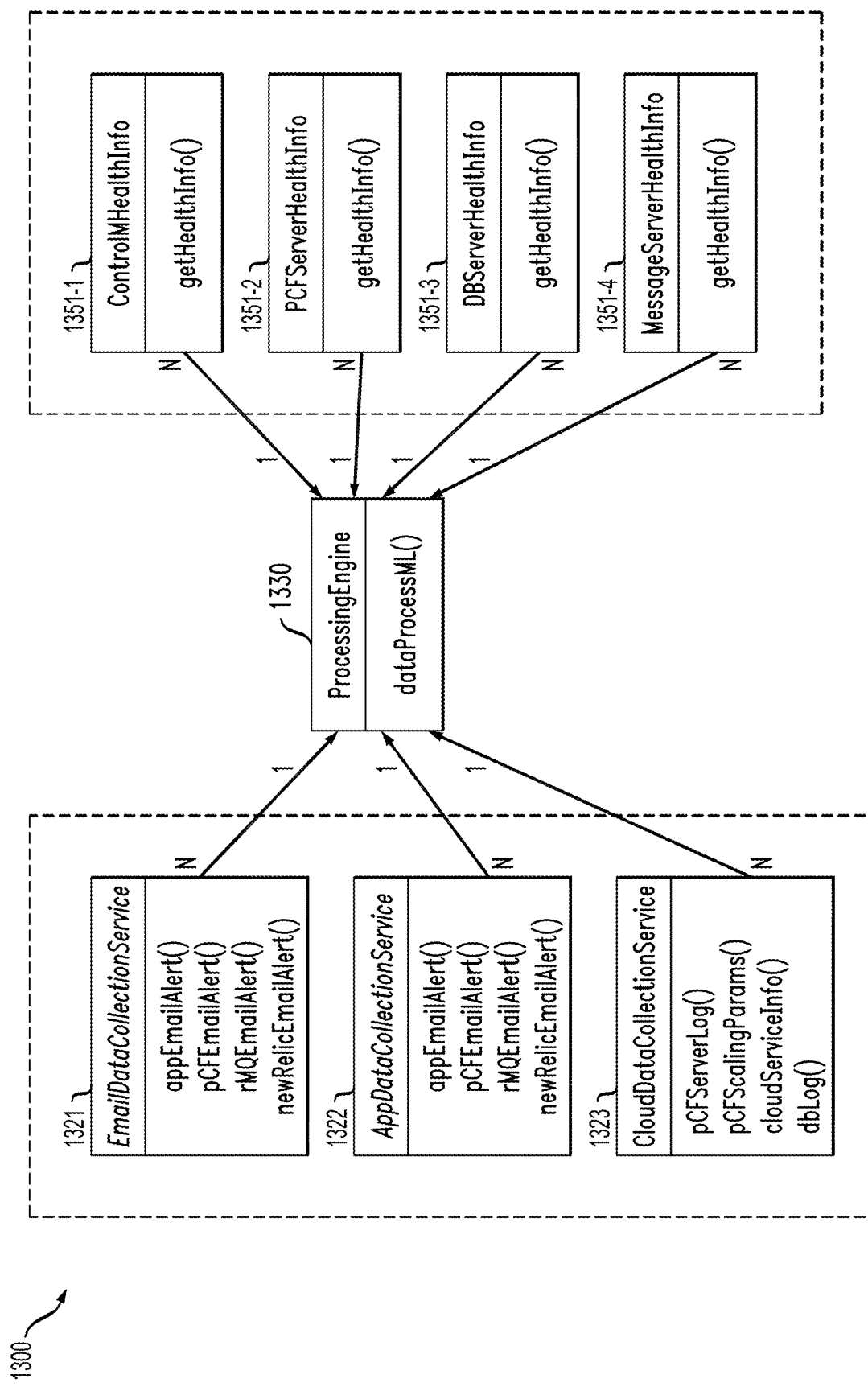
FIG. 13 depicts a class diagram for a component monitoring framework in an illustrative embodiment.

Referring to FIG. 13, a class diagram 1300 for a component monitoring framework is shown. The class diagram 1300 provides additional details for the email/messaging data collection layer 121, the application data collection layer 122 and the cloud data collection layer 123, the data modeling engine 130 and the monitoring APIs 151 of FIG. 1. For example, the email and application data collection services 1321 and 1322 (which correspond to the email/messaging and application data collection layers 121 and 122 in FIG. 1) collect data from application, PCF, RMQ and NewRelic email alerts and the cloud data collection service 1323 (which corresponds to the cloud data collection layer 123 in FIG. 1) collects data from PCF server and database logs, and collects PCF scaling parameters and cloud service information. The collected data is provided to the processing engine 1330 (which corresponds to the data modeling engine 130 in FIG. 1), which can use one or more machine learning techniques to parse the collected data to identify and categorize and/or sub-categorize the issues that may be occurring for the components of an ecosystem. Based on the categorization and/or sub-categorization of the data, the processing engine selects one or more APIs 1351 that correspond to the type of component and/or type of issue to be used to monitor respective real-time statuses of the components identified from the collected data as having issues. The processing engine 1330 pushes the corresponding data to the API associated with the data so that the monitoring can be performed and visualizations of the real-time statuses can be generated based on the results of the monitoring. The API 1351-1 corresponds to Control M health information, the API 1351-2 corresponds to PCF server health information, the API 1351-3 corresponds to database server health information and the API 1351-4 corresponds to message server health information. Each of the APIs process commands for retrieving the health information. The APIs 1351-1 to 1351-4 correspond to the APIs 151 in FIG. 1.

Persistent data collected by the data modeling engine 130 is stored in a database 140, and used to train one or more machine learning models that may be used to identify issues and/or determine categories and sub-categories of the collected data. The one or more machine learning models can also be used to identify metrics and key performance indicators (KPIs) associated with the components of the ecosystems 160.

According to one or more embodiments, the database 140 can be configured according to a relational database management system (RDBMS) (e.g., PostgreSQL). The database 140 in some embodiments is implemented using one or more storage systems or devices associated with the component monitoring framework 110. In some embodiments, one or more of the storage systems utilized to implement the database 140 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Figure 3:
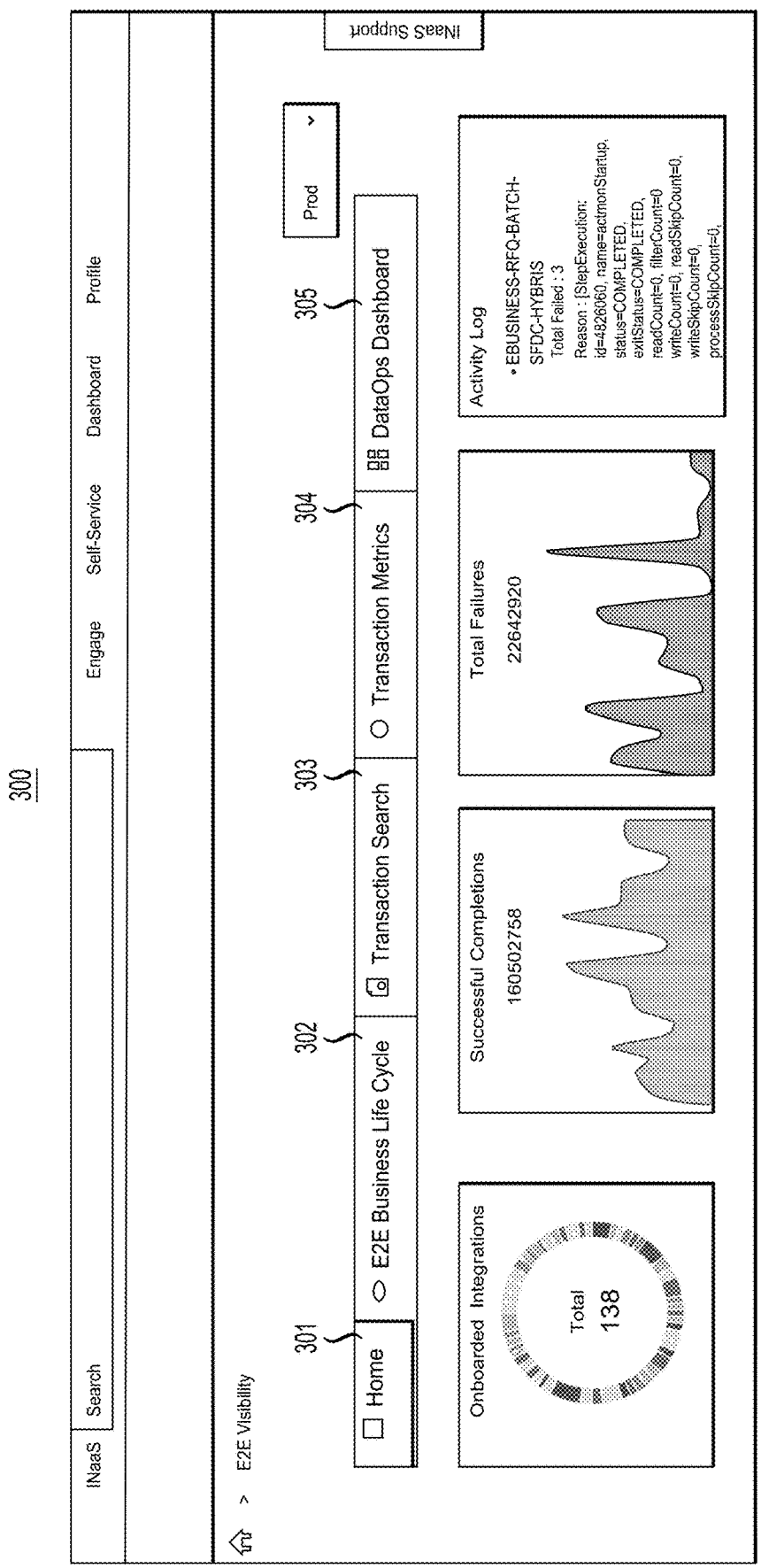
FIG. 3 depicts an example user interface comprising a dashboard summarizing end-to-end (E2E) data visibility in an illustrative embodiment.

Referring to FIG. 3, an example user interface 300 generated by one or more of the visualization layers 152 comprises a dashboard summarizing E2E data visibility associated with components of at least one ecosystem 160. For example, the user interface 300, in an overall view 301, shows the number of onboarded integrations, successful job and/or operation completions, total component and/or operation failures and an activity log. In a non-limiting illustrative example, a data science integration platform (DSIP) ecosystem may include thousands (e.g., 2,000+) of VMs hosting hundreds (e.g., 150) of different applications (e.g., data operations (DataOps) applications, cloud-based applications) and middleware.

As used herein, the term "middleware" is to be broadly construed to refer to software that links different applications. Some examples of middleware are products that establish connections between a web servers and database systems and connections between message producers and consumers. As used herein, the term "integration" or "integrations" is to be broadly construed to refer to middleware that is classified based on domains. Some examples of integrations are cloud integration, business-to-business (B2B) integration, application integration (A2A) and data integration products. Cloud integration products integrate with and between cloud services, cloud-based applications, private clouds, trade hubs. Cloud integration products may use, for example, web services and B2B communication strategies. B2B integration products integrate customer, provider and partner interfaces with various data resources and enterprise managed applications. A2A products integrate enterprise managed cloud-based and/or remote system applications with each other. Data integration products integrate enterprise data resources, such as, for example, databases and files, over enterprise and operational intelligence systems. Some non-limiting examples of middleware comprise MOM or message queue (MQ) products, autonomous integration cloud (AIC) products, service-oriented architecture (SOA) products and B2B products. As noted herein, the component monitoring framework 110 provides a one-stop live monitoring framework (OSLMF) that monitors applications, middleware, servers and VMs in a single dashboard. Referring to the user interface 300, E2E visibility capabilities include an overall view 301, a business (or other enterprise) lifecycle view 302, a transaction view 303, a metrics view 304 and a DataOps view 305. The activity log enumerates components or operations that may have failed and reasons for the failure. The visualization layers 152 are configured to proactively analyze component error logs to identify component problems.

Figure 4:
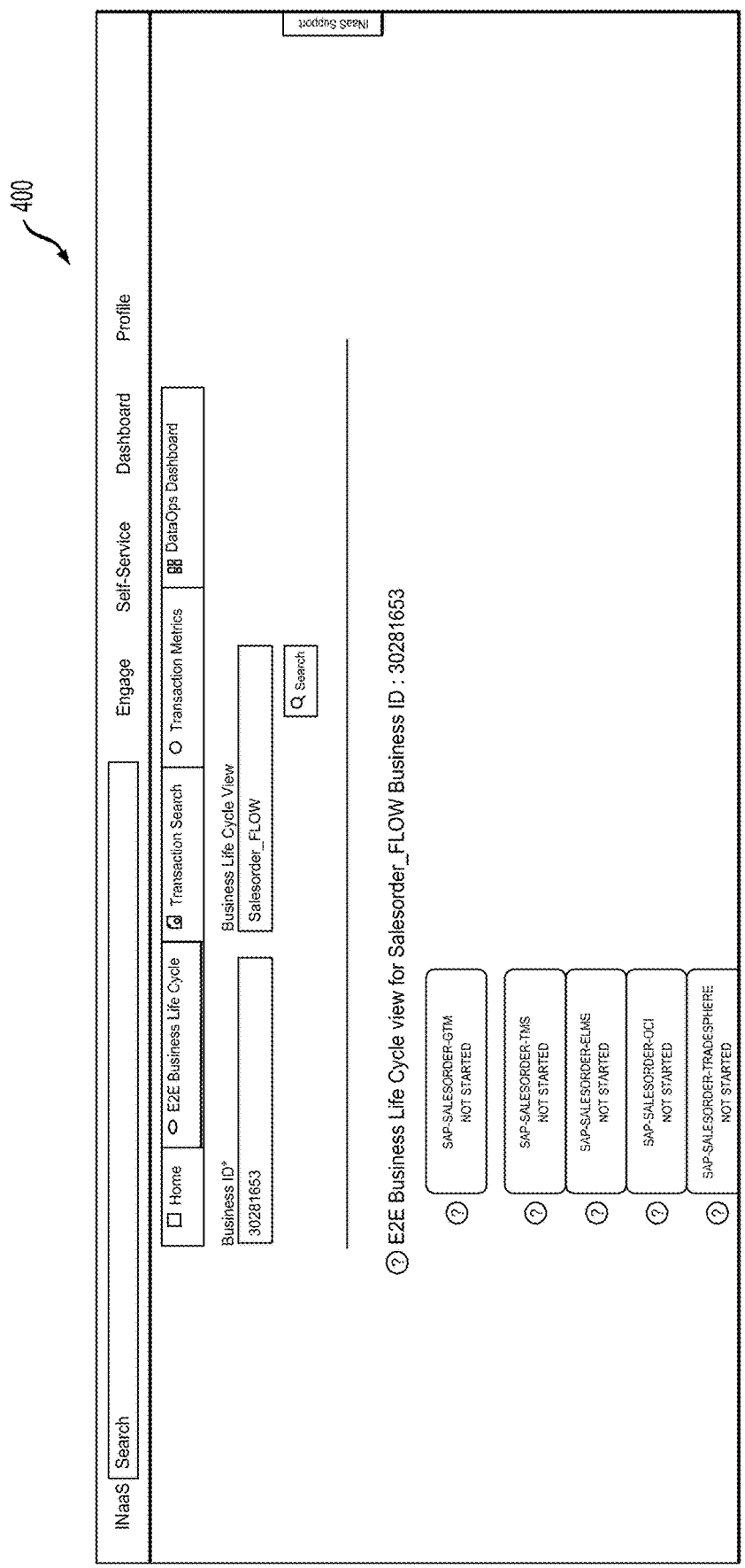
FIG. 4 depicts an example user interface comprising a business lifecycle view in an illustrative embodiment.

The business lifecycle view of the user interface 400 in FIG. 4 provides the current status of a transaction in terms of business flow. For example, in connection with the purchase of goods, when an order is booked, the order passes through many applications before being fulfilled and shipped from a factory. By using the E2E business lifecycle view, an order can be proactively tracked, and if there are any issues with the order due to, for example, failure of one or more components in an ecosystem, the issues can be addressed before a customer complains about a delay or other problem with the order. As can be seen in FIG. 4, the status of different steps for a given sales order in connection with enterprise resource planning software (SAP) are shown. In this case, none of the tasks have been started. The user interface 400 provides the status of each operation. Although the term "business" is used, the embodiments are not necessarily limited thereto, and similar user interfaces may be generated depicting process flows for operations in different types of commercial and non-commercial enterprises.

The user interface 500 in FIG. 5 comprises a transaction view in an illustrative embodiment. The component monitoring framework 110 tracks and traces application transactions flowing through different technology layers of an enterprise with multiple views of the transactions. For example, the component monitoring framework 110 provides views of cascading transactions, where dependency can have multiple levels, and concurrently tracks and traces the transactions in sequential and parallel flows. As can be seen in the user interface 500, transactions can be searched according to business identifier (ID), alternative business ID, status, application transaction type, sender, receiver, and according to date. Details of application transactions presented in the user interface 500 comprise, for example, actions, senders, receivers, status, timestamps and business ID associated with respective application transactions. In the user interface 500, "senders" refer to producers that produce the transactions, "receivers" refer to consumers that receive the transactions, and "app transactions" refer to different transaction types sorted according to application.

Figure 6:
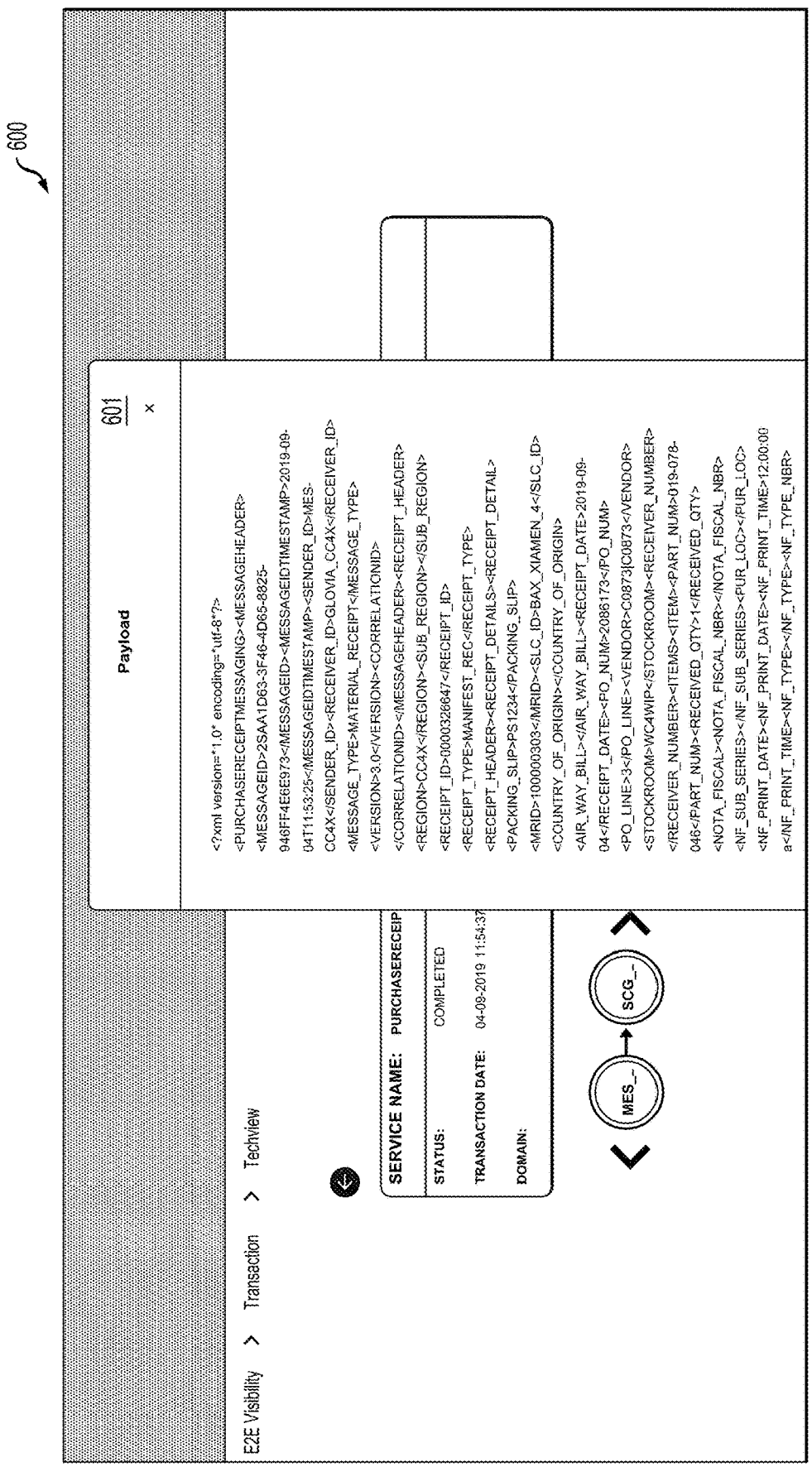
FIG. 6 depicts an example user interface comprising a payload view in an illustrative embodiment.

Onboarded application transactions can be viewed via the user interface 500. Referring to FIG. 6, a view of a payload can be added over a transaction view in the user interface 600. The display of the payload 601 facilitates tracking of data flowing through an ecosystem (e.g., DISP ecosystem) spanning many hubs and covering numerous VMs.

Figure 7:
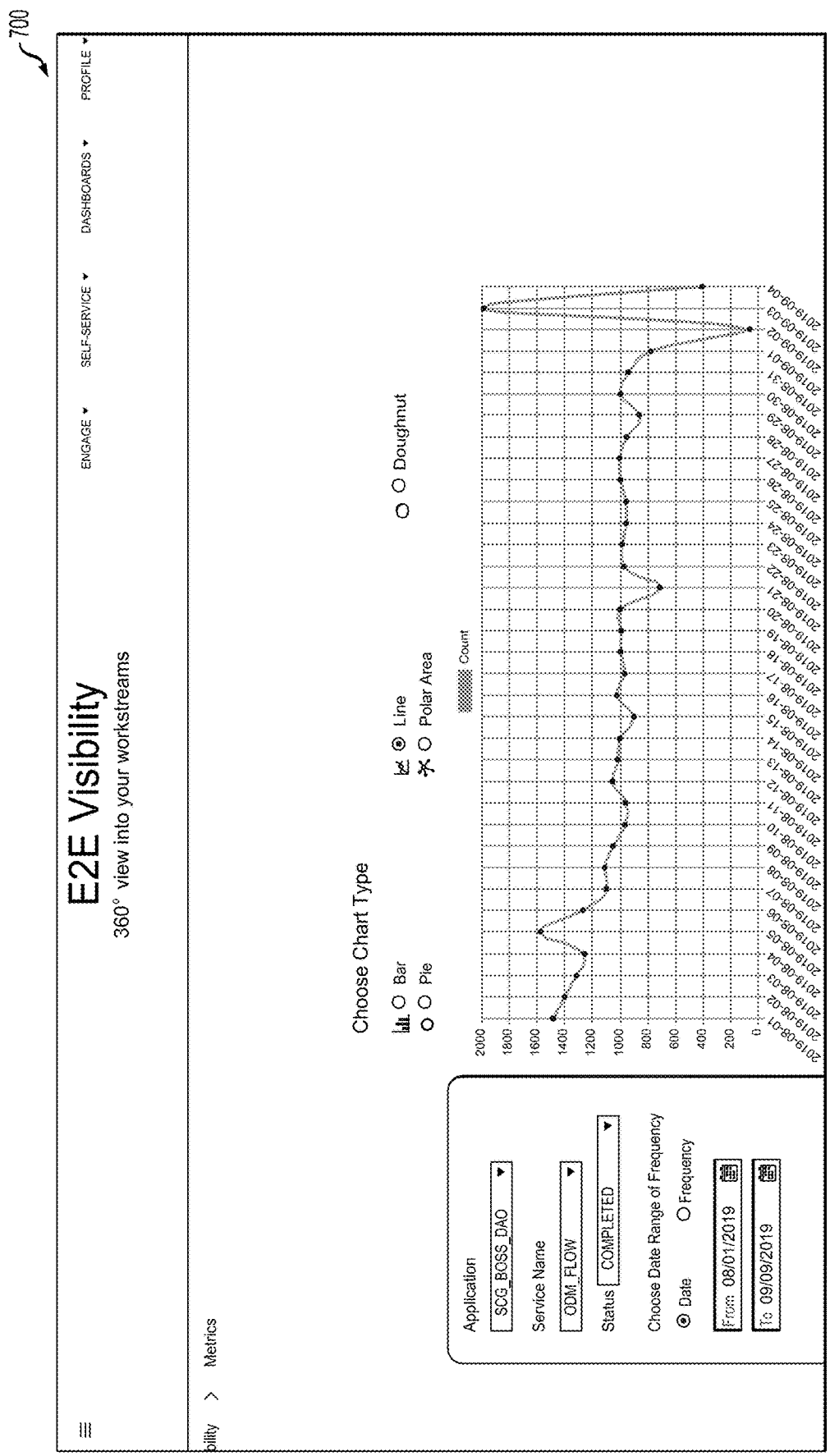
FIG. 7 depicts an example user interface depicting metrics of amounts of data flowing into and out of an application in an illustrative embodiment.

The user interface 700 in FIG. 7 depicts metrics of amounts of data flowing in and out of an application. According to one or more embodiments, the component monitoring framework 110, and more particularly, one or more of the visualization layers 152, generates metrics of amounts of data flowing in and out of monitored applications, which are monitored via one or more of the monitoring APIs 151. The metrics visualization facilitates data analysis and understanding of the types of data being sent to and from applications, as well as providing insight regarding the entities consuming the data. Users can use the metrics visualizations such as the visualization shown in user interface 700 in connection with data governance control and to scrutinize the data. Metrics visualizations generated by the component monitoring framework 110 provide full stack visibility of the types of data being inputted to and output from applications in an ecosystem. As can be seen in the user interface 700, a user can select how the data is illustrated (e.g., chart type-bar, pie, line, polar area, doughnut, etc.), and may select for which application the data is displayed. A user may also select the application status and a distribution based on date range or frequency. The numbers on the y-axis in the line graph represent amounts of data (e.g., bytes, MB, GB, etc.) and the x-axis includes date intervals (e.g., days, weeks, months, years, etc.).

Figure 8:
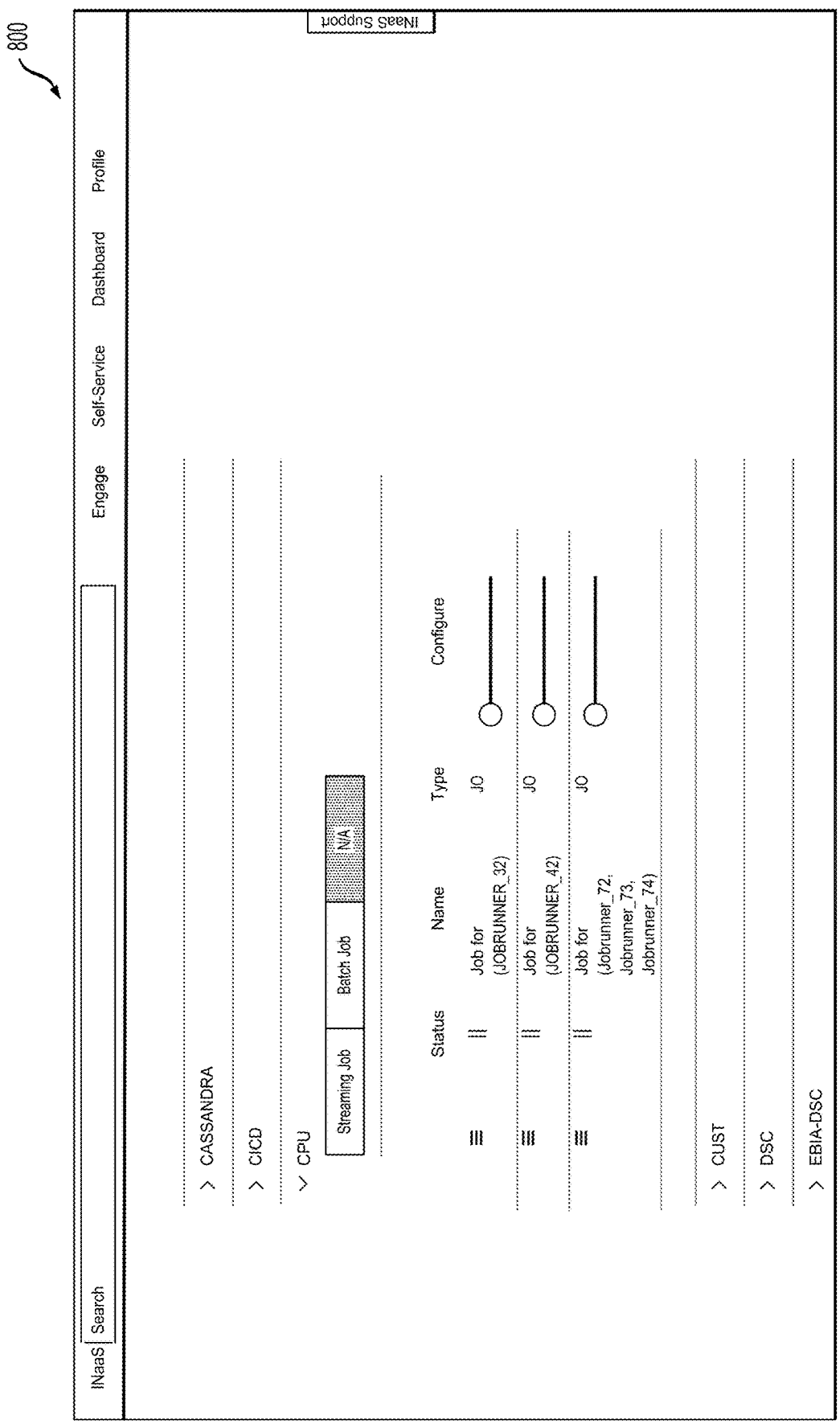
FIG. 8 depicts an example user interface depicting a data operations view in an illustrative embodiment.

The user interface 800 in FIG. 8 depicts a data operations view in an illustrative embodiment. The component monitoring framework 110 provides data operations (DataOps) job tracking and grouping of jobs based on, for example, projects and/or priority, which will facilitate monitoring of a project and/or higher priority jobs without having to navigate or search in different dashboards. Visualization layers 152 may generate interactive graphs showing job errors for given projects and/or job types to enable identification of failure trends associated with job types and/or projects. As can be seen in the user interface 800, jobs associated with different categories, components and/or software (e.g., database management systems (e.g., Cassandra), continuous integration/continuous delivery (CICD), central processing unit (CPU), customers (CUST), etc.) can be viewed and further sub-divided into different types (e.g., streaming jobs, batch jobs, etc.). The user interface 800 includes job status, job name and job type, as well as options for a user to configure a given job.

Figure 9A:
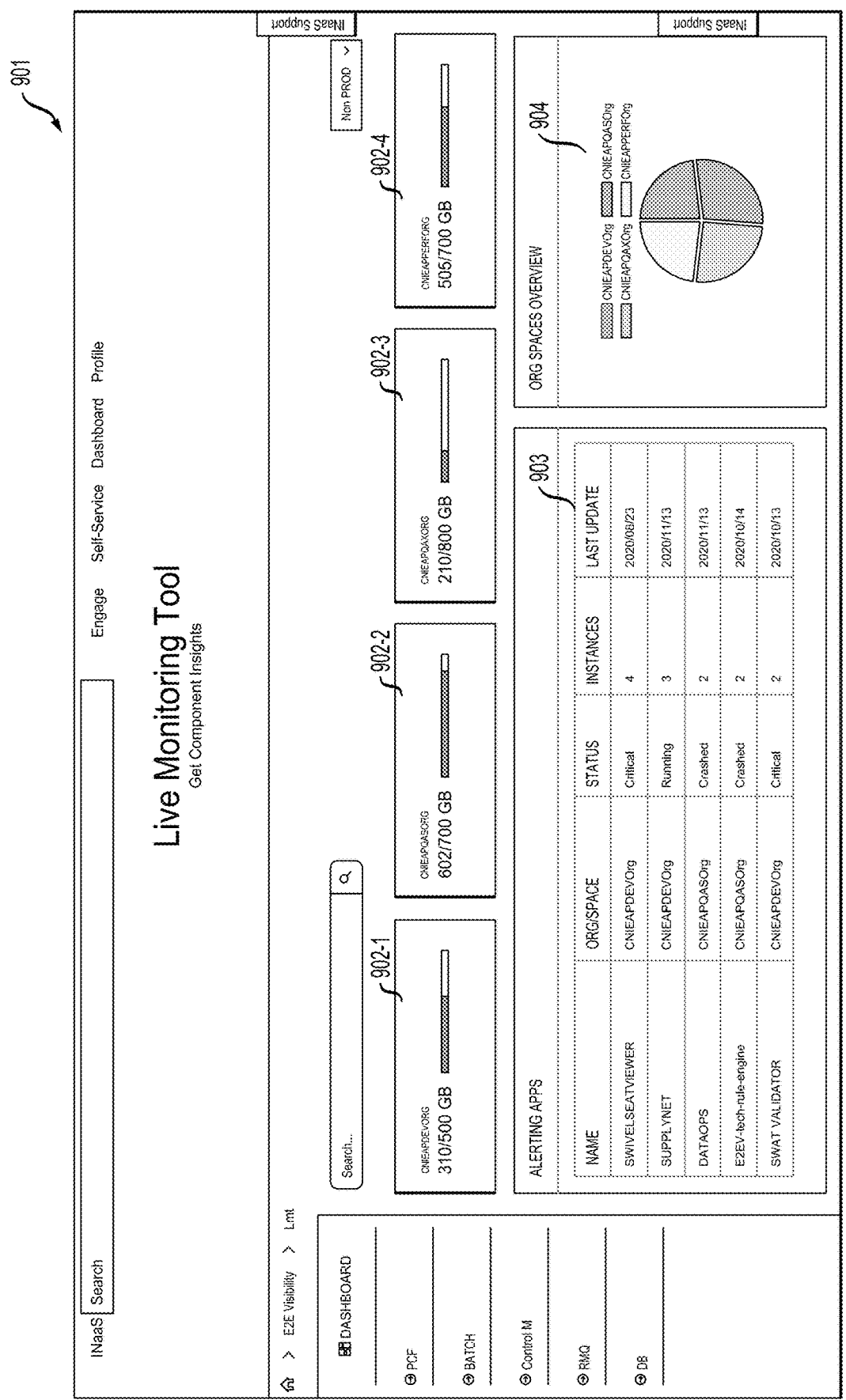
FIGS. 9A and 9B depict portions of an example user interface depicting statuses of applications in connection with cloud deployment service monitoring in an illustrative embodiment.
Figure 9B:
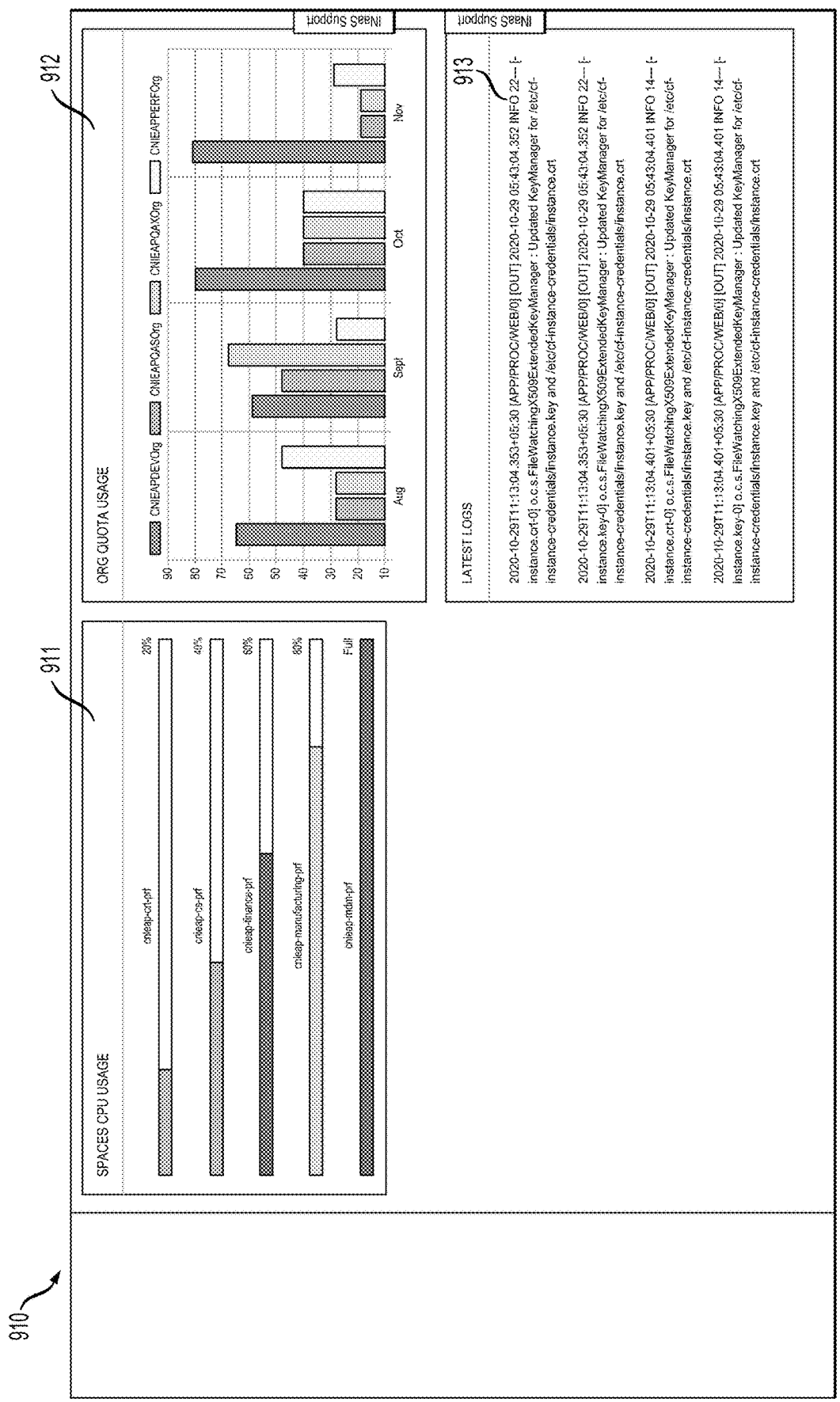

The user interface portions 901 and 910 in FIGS. 9A and 9B depict portions of a user interface depicting statuses of applications in connection with cloud deployment service (e.g., PCF) monitoring. For example, the user interface portions 901 and 910 depict the status of different applications belonging to different PCF orgs (e.g., CNIEAPDEV-Org, CNIEAPQASOrg, CNIEAPQAXOrg, CNIEAPPER-FOrg). As used herein, the term "org" in the context of PCF is to be broadly construed and refers to a development account that one or more users can own and use. Users access an org with user accounts. Collaborating users in an org share, for example, a resource quota plan, applications, services availability, and custom domains. Users may perform certain activities within an org, such as push applications, modify spaces, or bind services. As used herein, the term "space" in the context of PCF is to be broadly construed and refers to an area that provides users with access to a shared location for application development, deployment, and maintenance. An org can contain multiple spaces. Applications, services, and routes are scoped to a space.

For example, elements 902-1, 902-2, 902-3 and 902-4 and pie chart 904 provide details regarding relative amounts of memory occupied by the each of the applications relative to their corresponding PCF orgs. The chart 903 details respective applications along with their PCF org/space, status, number of instances and the date of their last update. As can be seen, some of the applications have a critical or crashed status. The interface may be interactive, such that in response to clicking on the name of the application, error logs for that application will be displayed. In the portion 910 of the user interface in FIG. 9B, element 911 provides details of CPU usage of a plurality of PCF spaces, element 912 comprises a bar graph showing details of PCF org quota memory usage according to quarterly portions of respective months, and element 913 shows logs (e.g., error logs) of one or more applications. The y-axis of the bar graph comprises percentages of a quota used by a given PCF org.

Figure 10:
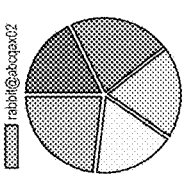
FIG. 10 depicts an example user interface depicting queue and consumer statuses in connection with message-oriented-middleware (MOM) monitoring in an illustrative embodiment.

The user interface 1000 in FIG. 10 depicts queue and consumer statuses in connection with MOM monitoring. For example, the user interface 1000 depicts the number of queues and consumers present in MOM servers (e.g., RMQ servers) and whether the nodes are critical.

For example, elements 1002, 1003, 1004 and 1005 depict the number of queues, consumers, connections and channels associated with non-production (non-PROD) MOM servers. The chart 1006 depicts details of respective alerting messaging channels along with their node, status, number of consumers and the date of their last update. As can be seen, some of the channels have a critical or crashed status. The interface may be interactive, such that in response to clicking on the channels having a critical or crashed status, consumers having issues (e.g., not receiving messages) will be displayed. The pie chart 1007 provides an overview of the MOM (e.g., RMQ) nodes.

The user interface 1100 in FIG. 11 depicts database statuses in connection with database monitoring. For example, the user interface 1100 depicts database usage. For example, elements 1102, 1103, 1104 and 1105 depict the amount of memory (GB), percentage of CPU usage, percentage of database logs and number of threads associated with one or more databases. The chart 1106 depicts details of respective alerting database instances defined by their host name, along with their user, status, number of connections and the date of their last update. As can be seen, some of the database instances have a critical or crashed status. The interface may be interactive, such that in response to clicking on the instances having a critical or crashed status, error logs for those database instances will be displayed. The pie chart 1107 provides an overview of the database instances.

Figure 12:
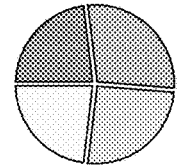
FIG. 12 depicts an example user interface depicting workflow orchestration service agent statuses in connection with workflow orchestration service monitoring in an illustrative embodiment.

The user interface 1200 in FIG. 12 depicts workflow orchestration service agent (e.g., Control M) statuses in connection with workflow orchestration service monitoring. For example, elements 1202, 1203 and 1204 depict different environments (e.g., Development, System Test and Production) associated with one or more jobs. The chart 1206 depicts details of respective jobs, along with their environment, status and the date of their last update. As can be seen, the jobs have a success or failed status. The interface displays graphical overviews failed and successful jobs. For example, the pie chart 1207 provides an overview of failed jobs.

Figure 14:
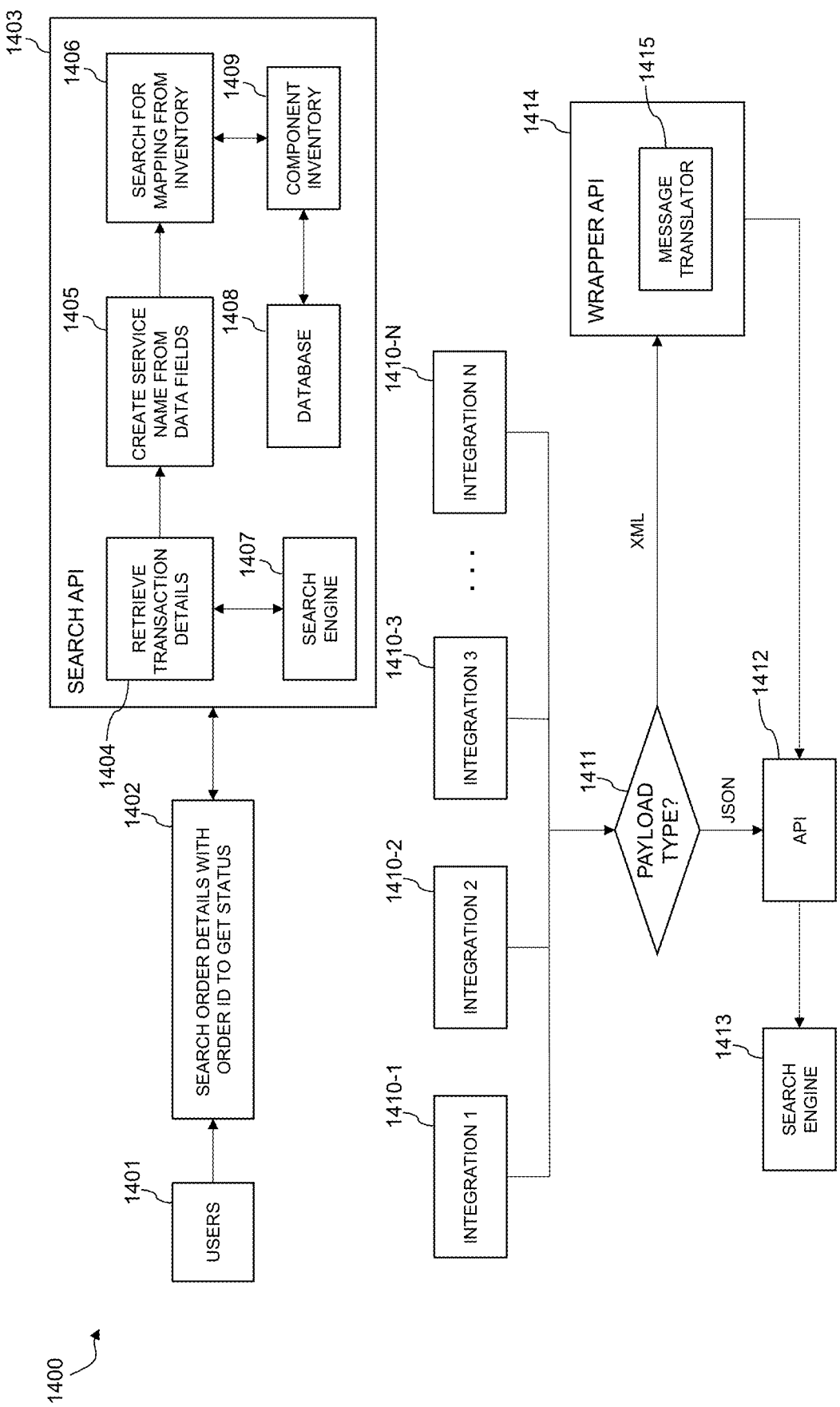
FIG. 14 depicts an operational flow in connection with obtaining E2E order status information in an illustrative embodiment.

FIG. 14 depicts an operational flow 1400 in connection with obtaining E2E order status information. For example, whenever an enterprise order is booked, it passes through numerous enterprise applications before being fulfilled and shipped from, for example, a factory. An order can be tracked proactively via the component monitoring framework 110, and if there are any issues with the order, the issues may be addressed prior to customer complaints. At block 1402, one or more users 1401 may search for order details via a user interface on, for example, a user device 102. Order details can be searched using, for example, and order identifier (ID) in order to obtain the order status. According to one or more embodiments, the search is performed via a search API 1403, which is configured to retrieve transaction details (block 1404) using an appropriate search engine 1407 (e.g., elastic search). At block 1405, the search API 1403 is further configured to create a service name from data fields from the retrieved transaction details. At block 1406, the API is used to search for mappings in a component inventory 1409 comprising mappings and relationship details of integrations 1410-1, 1410-2, 1410-3, . . . 1410-N (collectively "integrations 1410") in an ecosystem which are associated with the order. The inventory 1409 may be retrieved from a database 1408, such as, for example a relational database.

At block 1411, the integrations 1410 are analyzed to determine payload type. If an integration corresponds to an Extensible Markup Language (XML) payload type, the integration is sent to a wrapper API 1414, which processes the XML payload using a message translator 1415, and then sent to an API 1412 and to a search engine 1413 (e.g., elastic search). If an integration corresponds to a JavaScript Object Notation (JSON) payload type, the integration is directly sent to the API 1412 and to the search engine 1413.

The component monitoring framework 110 permits tracking and tracing of transactions to obtain data about payloads, errors, service level agreements (SLAs) and volume, and identify issues in an end-to-end (E2E) flow. The component monitoring framework further identifies failed or missing transactions due to one or more component issues, which facilitates reprocessing the missing or failed transactions once the component issues are resolved.

For example, the component monitoring framework 110, via the monitoring APIs 151: (i) identifies vendors and/or applications missing SLAs and which applications are taking more time to process transactions; (ii) measures the response time of transmissions between components and identifies the overall transmission time of a transaction from end-to-end; (iii) performs error monitoring by, for example, patterning component errors, which facilitates and increases the speed of issue triage and resolution; (iv) shares the data volume and/or data metrics to and from each component, which provides users with knowledge about the volume of data flowing through each component over a given time period; (v) identifies duplicate transactions and/or redundant transactions corresponding to one or more of the components or to vendors/partners; (vi) provides a consolidated view of successful and failed transactions over a given time period; (vii) integrates with various notification and/or alerting channels such as, for example, email and other notification/messaging channels; (viii) provides business or other enterprise context by correlating and/or categorizing the transactions; (ix) track issues and/or alerts related to different components and maps errors to component failures; and (x) provides deployment support by enabling control of services (e.g., pause/resume) in a B2B layer. It is to be understood that the above listing of capabilities of the component monitoring framework 110 is not exhaustive, and additional features of the component framework 110 can be available in other embodiments.

Figure 15:
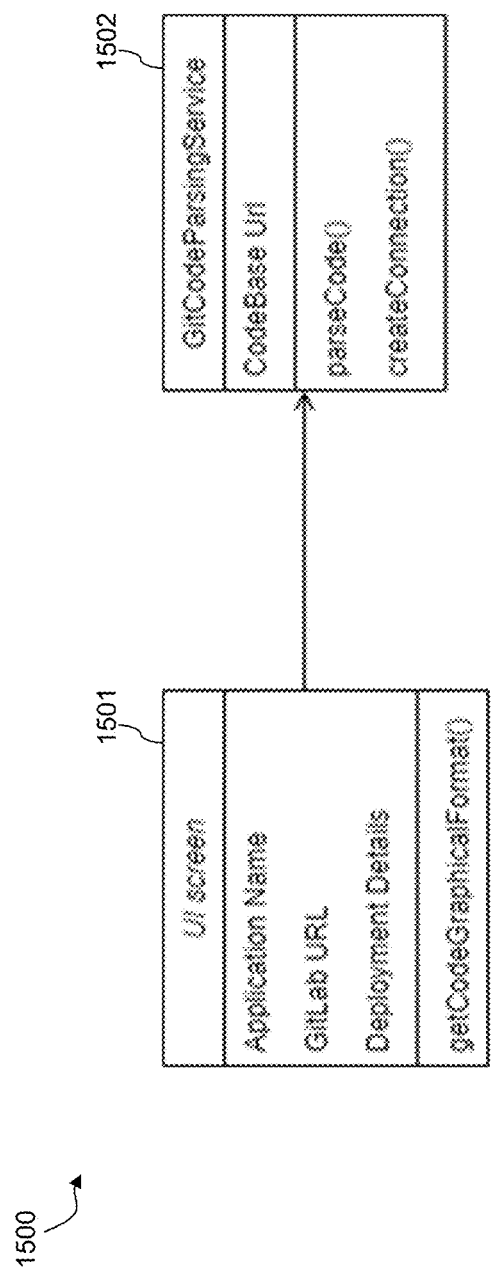
FIG. 15 depicts a class diagram corresponding to generation of graphical representations of code in an illustrative embodiment.
Figure 16:
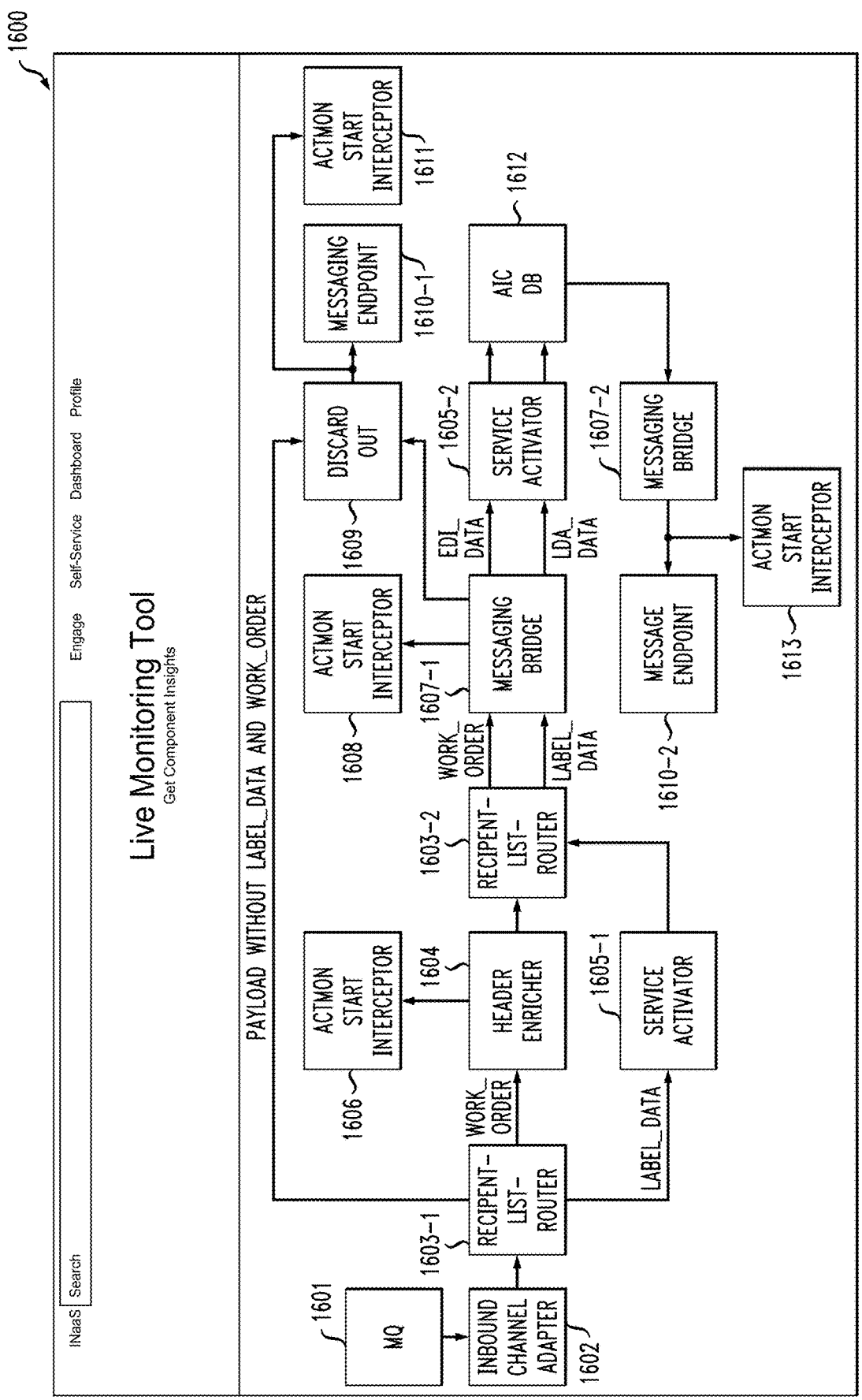
FIG. 16 depicts an example user interface comprising a graphical code representation in an illustrative embodiment.

Referring to FIGS. 15 and 16, one or more of the visualization layers 152 of the component monitoring framework 110 provide graphical visualizations of code for applications or other components of one or more of the ecosystems 160. Unlike a view of lines of code, a graphical representation illustrates the code graphically, and how the code interacts with source and target systems. For example, referring to the class diagram 1500 corresponding to the generation of graphical representations of code in FIG. 15, a user interface screen 1501 permits a user to input and/or display one or more of an application name, GitLab URL and deployment details for code of a given application or other component. One or more of the APIs 151 in conjunction with one or more of the visualization layers 152 generates a graphical depiction of the code. A GitCode parsing service 1502 accesses source code via a codebase URL, parses the code and generates the graphical representation of the code with connections to source and target systems.

Referring, for example, to the example user interface 1600 comprising a graphical code representation, in connection with code for a message queue (MQ) component 1601, an inputted message is provided to an inbound channel adapter 1602, which connects to a recipient-list-router 1603-1, which sends a work order to header enricher 1604 to enhance a message header to further classify the work order. The recipient-list-router 1603-1 also sends label data to a service activator 1605-1. The recipient-list-router 1603-1 further sends a payload without label data and a work order to a discard out layer 1609. The header enricher 1604 sends the enriched header to an active monitoring (ACTMON) start interceptor 1606 to begin active monitoring and to a recipient-list-router 1603-2. The service activator 1605-1 activates services associated with the received label data and forwards the resulting output to the recipient-list-router 1603-2.

The recipient-list-router 1603-2 forwards the processed work order and label data to a messaging bridge 1607-1 providing a bridge to different MOM providers. The messaging bridge 1607-1 sends EDI and LDA data to a service activator 1605-2, which activates services associated with the EDI and LDA data and forwards the EDI and LDA data to an AIC database (DB) 1612. The messaging bridge 1607-1 also sends the received word order and label data to an ACTMON information (INFO) interceptor 1608 and to the discard out layer 1609. The discard out layer sends the received payload and the processed work order and label data to a message endpoint 1610-1 and to an ACTMON terminate interceptor 1611.

The AIC database 1612 provides the EDI and LDA data to a messaging bridge 1607-2, which, in turn, provides the received EDI and LDA data to a message endpoint 1610-2 and to an ACTMON complete interceptor 1613.

Although shown as elements of the component monitoring framework 110, the data collection engine 120, data modeling engine 130, database 140 and/or monitoring and visualization engine 150 in other embodiments can be implemented at least in part externally to the component monitoring framework 110, for example, as stand-alone servers, sets of servers or other types of systems coupled to the network 104. For example, the data collection engine 120, data modeling engine 130, database 140 and/or monitoring and visualization engine 150 may be provided as cloud services accessible by the component monitoring framework 110.

The data collection engine 120, data modeling engine 130, database 140 and/or monitoring and visualization engine 150 in the FIG. 1 embodiment are each assumed to be implemented using at least one processing device. Each such processing device generally comprises at least one processor and an associated memory, and implements one or more functional modules for controlling certain features of the data collection engine 120, data modeling engine 130, database 140 and/or monitoring and visualization engine 150.

At least portions of the component monitoring framework 110 and the elements thereof may be implemented at least in part in the form of software that is stored in memory and executed by a processor. The component monitoring framework 110 and the elements thereof comprise further hardware and software required for running the component monitoring framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, data modeling engine 130, database 140, monitoring and visualization engine 150 and other elements of the component monitoring framework 110 in the present embodiment are shown as part of the component monitoring framework 110, at least a portion of the data collection engine 120, data modeling engine 130, database 140, monitoring and visualization engine 150 and other elements of the component monitoring framework 110 in other embodiments may be implemented on one or more other processing platforms that are accessible to the component monitoring framework 110 over one or more networks. Such elements can each be implemented at least in part within another system element or at least in part utilizing one or more stand-alone elements coupled to the network 104.

It is assumed that the component monitoring framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, data modeling engine 130, database 140, monitoring and visualization engine 150 and other elements of the component monitoring framework 110, and the elements thereof can each be implemented in the form of one or more LXCs running on one or more VMs. Other arrangements of one or more processing devices of a processing platform can be used to implement the data collection engine 120, data modeling engine 130, database 140 and monitoring and visualization engine 150, as well as other elements of the component monitoring framework 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the component monitoring framework 110 to reside in different data centers. Numerous other distributed implementations of the component monitoring framework 110 are possible.

Accordingly, one or each of the data collection engine 120, data modeling engine 130, database 140, monitoring and visualization engine 150 and other elements of the component monitoring framework 110 can each be implemented in a distributed manner so as to comprise a plurality of distributed elements implemented on respective ones of a plurality of compute nodes of the component monitoring framework 110.

It is to be appreciated that these and other features of illustrative embodiments are presented by way of example only, and should not be construed as limiting in any way.

Accordingly, different numbers, types and arrangements of system elements such as the data collection engine 120, data modeling engine 130, database 140, monitoring and visualization engine 150 and other elements of the component monitoring framework 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the component monitoring framework can be offered to cloud infrastructure customers or other users as part of FaaS, CaaS and/or PaaS offerings.

Figure 17:
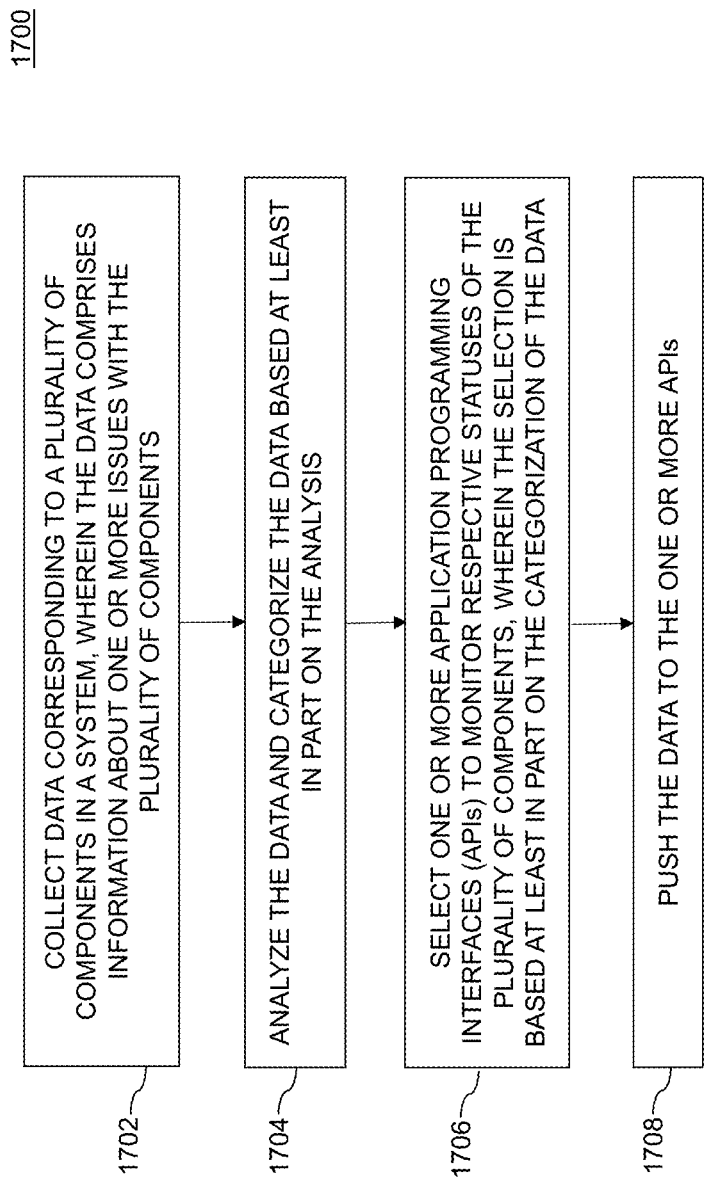
FIG. 17 depicts a process for monitoring ecosystem components according to an illustrative embodiment.

The operation of the information processing system 100 will now be described in further detail with reference to the flow diagram of FIG. 17. With reference to FIG. 17, a process 1700 for component monitoring as shown includes steps 1702 through 1708, and is suitable for use in the system 100 but is more generally applicable to other types of information processing systems comprising a component monitoring framework configured for monitoring ecosystem components.

In step 1702, data corresponding to a plurality of components in a system is collected. The data comprises information about one or more issues with the plurality of components. The plurality of components comprise one or more applications, one or more instances of middleware, one or more servers and/or one or more VMs. The data is collected from one or more electronic mail messages sent in response to the one or more issues, and/or from one or more component logs.

In step 1704, the data is analyzed and the data is categorized based at least in part on the analysis. In step 1706, one or more APIs are selected to monitor respective statuses of the plurality of components. The selection is based at least in part on the categorization of the data. In step 1708, the data is pushed to the one or more APIs.

In one or more embodiments, the process further includes receiving the respective statuses of the one or more components, and generating one or more visualizations depicting one or more of the respective statuses. The one or more respective statuses comprise, for example, an operating status of one or more applications, a number of queues and a number of consumers corresponding to message-oriented-middleware, an operating status of one or more message channels used by the message-oriented-middleware, an operating status of one or more databases, and/or an amount and/or a type of data flowing into and out of a given component of the one or more components. In one or more embodiments, the one or more respective statuses comprise real-time statuses.

In one or more embodiments, the process further includes retrieving code associated with one or more of the plurality of components, and generating a graphical representation of the code. The graphical representation of the code illustrates an interaction of the code with at least one of a source system and a target system.

In one or more embodiments, the process further includes receiving the respective statuses of the one or more components, identifying a given one of the one or more components missing an SLA based at least in part on the received respective statuses, and/or identifying one or more redundant transactions associated with the one or more components based at least in part on the received respective statuses.

It is to be appreciated that the FIG. 17 process and other features and functionality described above can be adapted for use with other types of information systems configured to execute component monitoring services in a component monitoring framework or other type of platform.

The particular processing operations and other system functionality described in conjunction with the flow diagram of FIG. 17 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 17 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a component monitoring framework as disclosed herein can provide a number of significant advantages relative to conventional arrangements. For example, the component monitoring framework permits tracking and tracing of transactions to obtain data about payloads, errors, SLAs and volume. As a further advantage, the component monitoring framework identifies issues in an E2E flow, which facilitates systematic reprocessing of failed or missing transactions, thereby saving time and computing resources. The embodiments track and trace transactions flowing through different technology layers of an enterprise with multiple views of transactions, especially of cascading transactions, where dependency can have multiple levels. For example, the embodiments concurrently track and trace transactions in sequential and parallel flows.

Unlike current approaches, the embodiments further provide graphical visibility of code for components in an ecosystem, illustrating how the code interacts with source and target systems, which can facilitate real-time tracking and tracing of E2E transaction details. Current approaches fail to provide a single source for accessing information for applications, middleware, servers and VMs. Moreover, current approaches fail to provide views of operations based on project, priority based sorting of operations and graphical representations of operations.

The embodiments advantageously optimize the monitoring of applications, middleware, servers and VMs in a single dashboard, thus removing the need for multiple monitoring tools using technologies of different vendors. The embodiments retrieve data from various message and notification sources, as well as from application, middleware and server logs. The data is parsed, categorized, and pushed to various monitoring APIs to detail the live status of the components of an ecosystem. The embodiments further provide techniques for tracking multiple operations associated with multiple projects, by grouping the operations based on project and/or program. The embodiments further facilitate data governance for data control and scrutiny by tracking data being input to and output from data orgs.

The embodiments further provide multiple visualizations of real-time statuses of the components of an ecosystem. The visualizations provide ready access to component error logs for troubleshooting of component issues, as well as graphical representations of the statuses of the ecosystem components.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the component monitoring framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a component monitoring framework in illustrative embodiments. These and other cloud-based systems in illustrative embodiments can include object stores.

Illustrative embodiments of processing platforms will now be described in greater detail with reference to FIGS. 18 and 19. Although described in the context of system 100, these platforms may also be used to implement at least portions of other information processing systems in other embodiments.

Figure 18:
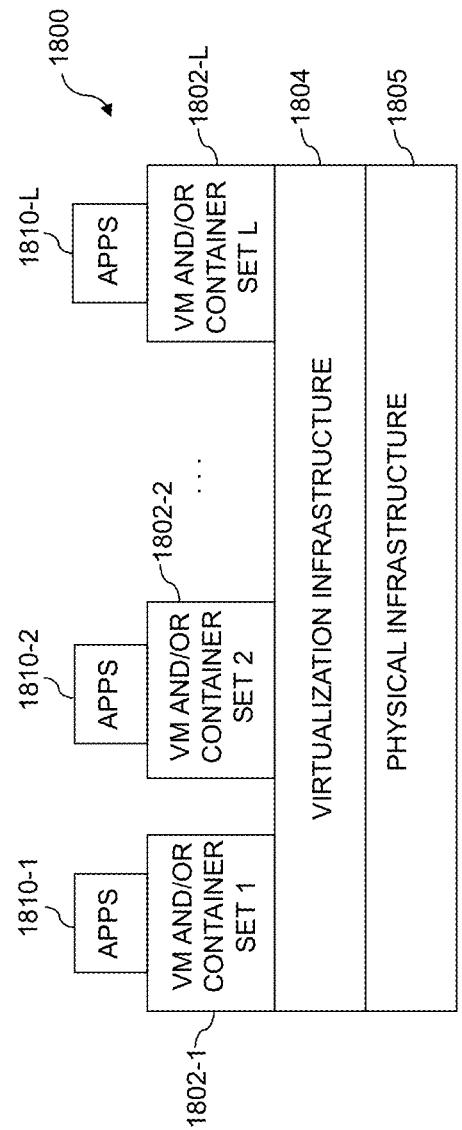
FIGS. 18 and 19 show examples of processing platforms that may be utilized to implement at least a portion of an information processing system according to illustrative embodiments.
Figure 19:
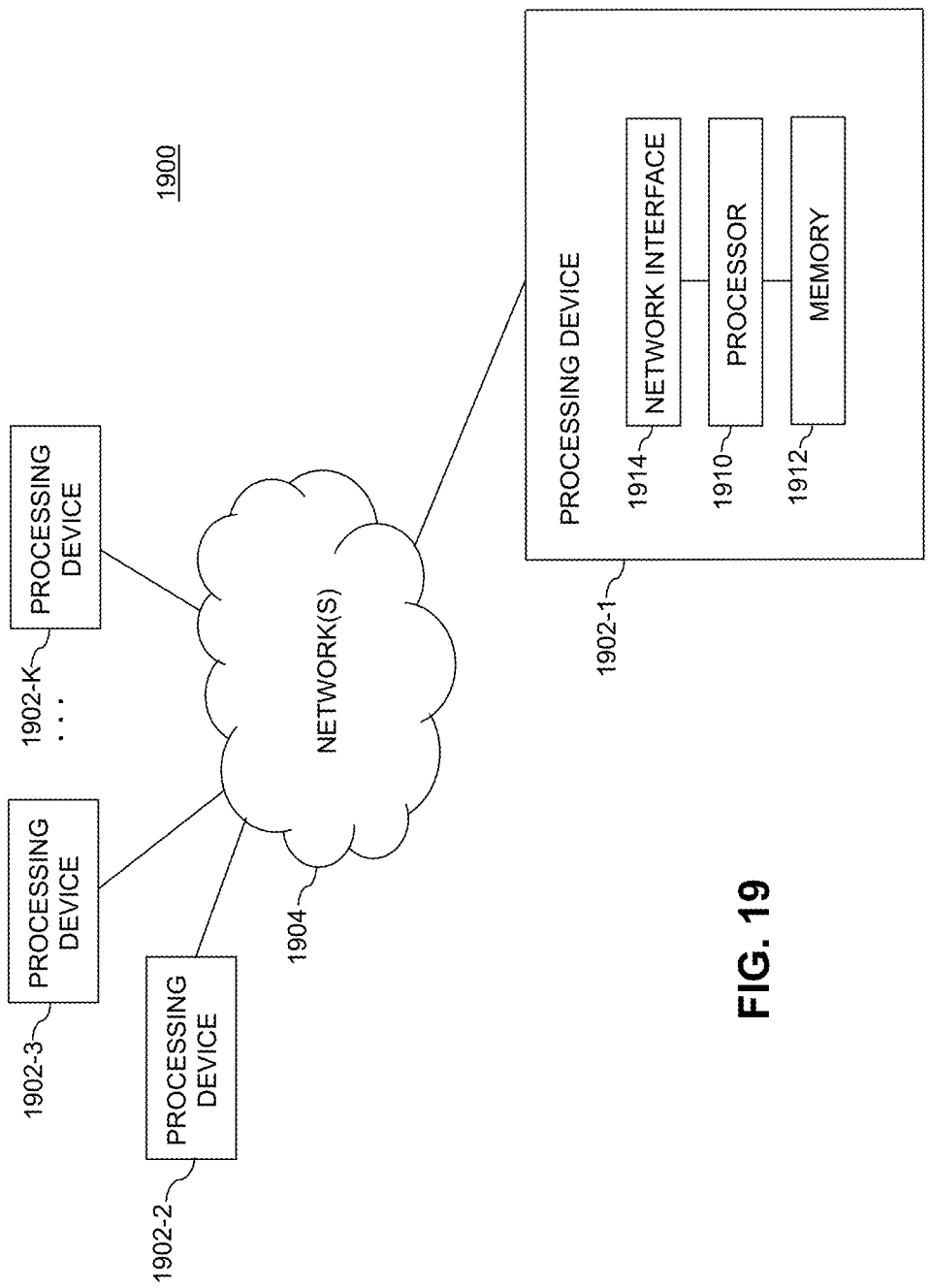

FIG. 18 shows an example processing platform comprising cloud infrastructure 1800. The cloud infrastructure 1800 comprises a combination of physical and virtual processing resources that may be utilized to implement at least a portion of the information processing system 100. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912. The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the component monitoring framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and component monitoring frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   collecting data corresponding to a plurality of components in a system, wherein the data comprises information about one or more issues associated with the plurality of components;
   using one or more machine learning models to analyze the data and categorize the data based at least in part on the analysis to determine at least one component type and issue type for the one or more issues associated with the plurality of components;
   selecting from a plurality of application programming interfaces (APIs) two or more APIs that are configured to monitor respective statuses of the plurality of components, wherein the selection is based at least in part on the APIs of the plurality of APIs which correspond to the categorized data, the determined component type, and the issue type for the one or more issues associated with the plurality of components;
   pushing portions of the data to corresponding ones of the two or more selected APIs;
   retrieving code associated with one or more of the plurality of components, wherein the code is associated with the one or more issues associated with the plurality of components;
   parsing the code;
   generating a graphical representation of the code for display on a user interface based at least in part on the parsing, wherein the two or more selected APIs are used to generate the graphical representation of the code, and wherein the graphical representation of the code illustrates one or more connections and one or more data transfers between at least two elements caused by execution of the code;
   identifying one or more anticipated failures associated with one or more of the plurality of components identified in the one or more issues; and
   facilitating reprocessing of transactions associated with the anticipated failures;
   wherein the steps of the method are executed by a processing device operatively coupled to a memory.

2. The method of claim 1, wherein the plurality of components comprise one or more applications, one or more instances of middleware and one or more servers.

3. The method of claim 1, wherein the plurality of components further comprise one or more virtual machines.

4. The method of claim 1, further comprising:
   receiving the respective statuses of the one or more components; and generating one or more visualizations depicting one or more of the respective statuses.

5. The method of claim 4, wherein the one or more respective statuses comprise an operating status of one or more applications.

6. The method of claim 4, wherein the one or more respective statuses comprise a number of queues and a number of consumers corresponding to message-oriented-middleware.

7. The method of claim 6, wherein the one or more respective statuses further comprise an operating status of one or more message channels used by the message-oriented-middleware.

8. The method of claim 4, wherein the one or more respective statuses comprise an operating status of one or more databases.

9. The method of claim 4, wherein the one or more respective statuses comprise at least one of an amount and a type of data flowing into and out of a given component of the one or more components.

10. The method of claim 4, wherein the one or more respective statuses comprise real- time statuses.

11. The method of claim 1, wherein the at least two elements comprise a source system and a target system.

12. The method of claim 1, wherein the data is collected from one or more electronic mail messages sent in response to the one or more issues.

13. The method of claim 1, wherein the data is collected from one or more component logs.

14. The method of claim 1, further comprising:
   receiving the respective statuses of the one or more components; and
   identifying a given one of the one or more components missing a service level agreement (SLA) based at least in part on the received respective statuses.

15. The method of claim 1, further comprising:
   receiving the respective statuses of the one or more components; and identifying one or more redundant transactions associated with the one or more components based at least in part on the received respective statuses.

16. An apparatus comprising:
a processing device operatively coupled to a memory and configured to:
   collect data corresponding to a plurality of components in a system, wherein the data comprises information about one or more issues associated with the plurality of components;
   use one or more machine learning models to analyze the data and categorize the data based at least in part on the analysis to determine at least one component type and issue type for the one or more issues associated with the plurality of components;
   select from a plurality of application programming interfaces (APIs) two or more APIs that are configured to monitor respective statuses of the plurality of components, wherein the selection is based at least in part on the APIs of the plurality of APIs which correspond to the categorized data, the determined component type, and the issue type for the one or more issues associated with the plurality of components;
   push portions of the data to corresponding ones of the two or more selected APIs;
   retrieve code associated with one or more of the plurality of components, wherein the code is associated with the one or more issues associated with the plurality of components;
   parse the code;
   generate a graphical representation of the code for display on a user interface based at least in part on the parsing, wherein the two or more selected APIs are used to generate the graphical representation of the code, and wherein the graphical representation of the code illustrates one or more connections and one or more data transfers between at least two elements caused by execution of the code;
   identify one or more anticipated failures associated with one or more of the plurality of components identified in the one or more issues; and
   facilitate reprocessing of transactions associated with the anticipated failures.

17. The apparatus of claim 16, wherein the processing device is further configured to:
   receive the respective statuses of the one or more components; and
   generate one or more visualizations depicting one or more of the respective statuses.

18. An article of manufacture comprising a non-transitory processor-readable storage medium having stored therein program code of one or more software programs, wherein the program code when executed by at least one processing device causes said at least one processing device to perform the steps of:
   collecting data corresponding to a plurality of components in a system, wherein the data comprises information about one or more issues associated with the plurality of components;
   using one or more machine learning models to analyze the data and categorize the data based at least in part on the analysis to determine at least one component type and issue type for the one or more issues associated with the plurality of components;
   selecting from a plurality of application programming interfaces (APIs) two or more APIs that are configured to monitor respective statuses of the plurality of components, wherein the selection is based at least in part on the APIs of the plurality of APIs which correspond to the categorized data, and the determined component type and the issue type for the one or more issues associated with the plurality of components;
   pushing portions of the data to corresponding ones of the two or more selected APIs;
   retrieving code associated with one or more of the plurality of components, wherein the code is associated with the one or more issues associated with the plurality of components;
   parsing the code;
   generating a graphical representation of the code for display on a user interface based at least in part on the parsing, wherein the two or more selected APIs are used to generate the graphical representation of the code, and wherein the graphical representation of the code illustrates one or more connections and one or more data transfers between at least two elements caused by execution of the code;
   identifying one or more anticipated failures associated with one or more of the plurality of components identified in the one or more issues; and
   facilitating reprocessing of transactions associated with the anticipated failures.

19. The article of manufacture of claim 18, wherein the program code causes said at least one processing device to further perform the steps of:
   receiving the respective statuses of the one or more components; and
   generating one or more visualizations depicting one or more of the respective statuses.

20. The article of manufacture of claim 18 wherein the at least two elements comprise a source system and a target system.

* * * * *